Patented June 20, 1944

UNITED STATES PATENT OFFICE 2,351,716

2,351,716

COATING COMPOSITION AND METHOD OF MAKING

Robert L. Smith, Niagara Falls, N. Y., assignor to The Carborundum Company, Niagara Falls, N. Y., a corporation of Delaware No Drawing. Application December 16, 1938, Serial No. 246,133

9 Claims. (Cl. 260—30)

This invention relates to liquid coating compositions and methods of manufacturing the same. More specifically, the invention is directed to such liquid compositions comprising a suspension of a normally solid resin in a normally liquid resinous material, such as the well-known phenol aldehyde condensation products.

As will hereinafter appear, my invention may be applied to coating compositions made up of any of a number of kinds of resins. It has been found to be specially well adapted to the preparation of coatings employing phenol-aldehyde condensation products and will be particularly described with respect to such compositions.

In making coating compositions with resins it has heretofore been customary to employ either a solid resin dissolved in a solvent such as alcohol or acetone or to use a normally liquid resin which can be converted to a solid stage by heating.

The solutions of solid resin in solvents have a number of objections. If a thin coat of such a solution is applied to a surface for the purpose of forming a film on such surface, there is a considerable tendency for the solution to penetrate the material being coated, if such material is at all porous, unless the solution has a very high viscosity in which case it is extremely difficult to apply a thin film. Furthermore, such solutions tend to skin over by reason of the evaporation of the solvent on the exposed surface of the film and thereby entrap the remaining solvent in a more or less liquid mass under such skin. It is therefore extremely difficult to remove the solvent from such films without causing blistering due to the formation of the skin and the extension of film when the solvent in the mass under it is driven off. In order to overcome such difficulty, it is customary to employ mixed solvents containing both solvents of low boiling point and others of high boiling point so that the high boiling solvent leaves the film in a liquid condition while the low boiling solvent is being removed. However, the high boiling solvent is also difficult to remove because of its low vapor pressure at ordinary temperatures and if the temperatures are raised to hasten the evaporation of the solvent, the fluidity increases, resulting in penetration of the backing by the solution.

The second method of forming films with phenolic resins is based on the use of normally liquid materials. However, as has been explained, such materials are but slightly reacted towards their final ultimate condition and consequently require a relatively long heat treatment to advance them to the "C" stage. Furthermore, as films of liquid resin are heated to bring about reaction towards this final condition, the films become thin, following the well-known law that an increase in temperature lowers the viscosity of liquids. In order to prevent penetration of the material being coated by such liquids or the flowage of such liquids, it is necessary to proceed very slowly and cautiously with the heating so as to prevent this thinning of the liquid compositions during the curing.

It will therefore be seen that the use of either solutions of normally solid materials or of normally liquid resins for coating compositions has a number of disadvantages as outlined. It is accordingly an object of the present invention to provide liquid coating compositions comprising resins which are relatively slightly penetrative of porous materials and capable of being hardened at relatively rapid rates. Another object of the invention is to provide a method of making such compositions. Still another object of the invention is to provide coating compositions comprising both normally liquid and normally solid resinous materials, which compositions are relatively impenetrative and capable of being advanced to the "C" stage at relatively rapid rates. A further object of the invention is to provide a method of applying films of resinous materials to the surface of various articles. Other objects will appear from a consideration of the invention as described herein.

My coating compositions consist essentially of two phases, a liquid phase and a solid phase, the solid phase being suspended in the liquid phase. The principle employed involves the suspension of a normally solid phase in finely divided form in a liquid phase which is a poor solvent for the solid phase but which is readily converted, when spread into a film, into a liquid phase which is a good solvent for the solid phase. Specifically, by way of illustration, I have successfully employed a mixture of a normally liquid phenol aldehyde resin with water as the liquid phase, and a finely divided phenol aldehyde condensation product which is further advanced than the liquid resin as the solid phase.

As is well known, phenol-aldehyde condensation products are made by reacting a phenol and an aldehyde, usually in the presence of a catalyst to hasten the reaction, whereby there may be obtained, as an intermediate product, a resinous material which is solid at ordinary temperatures, fusible and soluble in such common solvents as alcohol and acetone, and capable of being converted by heat to a very strong, tough resin which is infusible and insoluble.

In carrying out such a reaction, there is first formed a normally liquid oily material which is commonly referred to as a "normally liquid resin." Upon continued heating, the liquid resin increases in viscosity and eventually becomes solid at ordinary temperatures. If the reaction is stopped at this stage there is obtained what is known as a solid "A" stage resin which is fusible and soluble in ordinary solvents. If such a resin is further heated, it passes through what Baekeland has designated as a "B" stage, at which time it is softenable by heat but no longer fusible and is not materially soluble in ordinary solvents. Still further heating advances the product to the so-called "C" stage, which is insoluble and infusible.

The initial reaction between a phenol and an aldehyde is generally understood to be a condensation reaction wherein the phenol and the aldehyde combine chemically with a splitting off of water. Upon continued heating, the condensation reaction becomes completed and the condensation products thus formed unite by polymerization to form larger molecules, the ultimate of such reaction being the so-called "C" stage material.

It is now generally accepted that in carrying out the resinification of a phenol with an aldehyde, the reaction does not proceed by stages but rather in any mass of material being reacted there is present at any given time unreacted material such as free phenol and free aldehyde, condensed material in the form of relatively small molecules, and other molecules which have been further reacted to form larger agglomerates. Consequently, the ordinary liquid resin is understood to be made up of a heterogeneous mixture of such compounds. Where relatively pure chemical compounds are used as raw materials, and care is taken in the reaction, the difference in size of the molecules is comparatively small. On the other hand, some types of phenols react more rapidly than other of such compounds and if a comparatively impure material is employed the liquid resin may run the whole extreme from unreacted particles to particles which are well advanced towards the "C" stage.

By the same token the "B" stage, which is referred to as a transitory stage between the "A" stage and the "C" stage, is understood to be actually a mixture of "C" stage particles with "A" stage particles. Consequently, in any phenol aldehyde condensation product which is available commercially there is present, in the mass of resin, molecules of various sizes and various degrees of reactivity.

The ordinary liquid resin contains a greater or less amount of unreacted phenolic constituent, depending upon the extent to which the reaction has been carried on which, in turn, largely determines the viscosity of the resin. Probably because of the presence of the unreacted phenol, or possibly because the smaller resin molecules are good solvents, the ordinary solid "A" stage resin is soluble in the ordinary liquid resin.

Liquid resins may or may not be miscible with water depending, among other things, upon the composition of the materials used in preparing the resin, the type of reaction which is brought about as determined by the choice of catalysts, and the pH of the resin. The presence of alkali usually promotes water miscibility of liquid resins. The reason for this increase in water miscibility is not yet understood, some schools advocating the theory that the alkali forms phenolates with free phenol and such phenolates promote colloidal suspensions of the less soluble resin molecules while others maintain it is merely a matter of the pH of the material. In any event, it is known that water can be mixed with liquid resins, particularly in the earlier stages, and that miscibility can be promoted by the addition of alkalies or by adding to the liquid resin a mutual solvent for the resin and for water.

The solvent power of liquid resins for solid resins is reduced by admixing water with the liquid resins. Likewise, the solvent power of the mixtures of liquid resins in water for solid resin increases with increase in temperature so that a particular mixture can be made to dissolve solid resin by warming such mixture and adding resin and upon cooling the solid constituents will be precipitated from the liquid component.

My compositions may be prepared by a number of methods and I will now illustrate the invention by a specific example of a method which I have found to be quite satisfactory in carrying out this part of the invention.

I take two parts of a normally liquid phenol aldehyde condensation product which is relatively thin because it has been reacted to only a small extent, and which contains about 40% of volatile material, principally as free phenol. With these two parts of liquid resin, I mix one part of water and I gradually add this mixture to five parts of a finely pulverized normally solid "A" stage phenol aldehyde condensation product, while continually stirring, to form a smooth stiff paste. I heat this paste to about 125° F. with continued stirring until I have obtained a smooth creamy fluid. During this step of the process, all or in any event a large part of the powdered resin dissolves in the liquid. I then add three additional parts of the mixture of two parts liquid resin with one part of water, the mixture being at ordinary temperature. The cooling resulting from this addition causes a precipitation of finely divided solid material and I continue stirring, while cooling, until the constituents have been blended into a smooth thin cream. I preferably pass this cream through a screen in order to remove any agglomerates of the solid resin which may not have been broken up and dispersed through the liquid phase.

I prefer to make up this composition some hours, at least, before it is to be employed as I have found that the composition smooths out and becomes more uniform as a result of such aging. I have also observed that when the liquid cools to ordinary room temperature, there appears to be a separation of additional solid material which I attribute to the fact that the liquid resin and water mixture is a mild solvent for the solid material at elevated temperatures but is a poor solvent at ordinary temperatures so that some of the solid material which is dissolved at the elevated temperatures precipitates upon cooling.

Another method which I have used in preparing my coating compositions comprises mixing a rather thick liquid resin with a much thinner liquid resin and with water and heating the mixture to bring about further reaction of the resinous components of the mixture. As the mixture is heated, the resins react and the more advanced components of the thicker liquid resin reach the stage where at least a part of them are normally solid and are precipitated from the liquid mixture in the form of finely divided solid particles when the mixture is cooled.

As I have stated above, the miscibility of liquid resin with water varies depending upon the raw materials employed in making the resins, the kind of catalyst that is used and the extent to which the reaction has been advanced. I have also pointed out that the miscibility of such resins with water can be promoted by raising the pH of the liquid which is conveniently done by employing an alkali. Consequently, where the resinous materials are not miscible with water to the extent that may be desired, I add an aqueous solution of an alkali such as caustic soda. A 4% solution of caustic soda in water has been found to be quite satisfactory for most purposes.

My coating compositions may be employed for a great many purposes where it is desired to form a film of resin on a surface. I have found that they have the very unexpected and desirable property of being poorly penetrative of bodies which are normally quite absorptive to liquids. For example, ordinary paper will soak up a normally liquid resin or a solid resin in a solvent such as alcohol to such an extent that the paper becomes impregnated with the resin with consequent stiffening and embrittlement of the paper when the resin is heat-hardened. My coating compositions, on the contrary, remain on the surface of such materials and penetrate the surface only to the extent necessary to make them adhesive to the surface being coated. I presume that this property results from the fact that when the composition is spread on the materials by coating in the form of a thin film, the volatile constituents of the composition, including the water, are rapidly removed and leave behind a relatively thick liquid which becomes additionally thickened by the solution of the solid constituent in the solvent liquid. In addition the compositions have the advantage that they do not become thinned when heated to cure the resin because the dissolving of the solid resin in the liquid resin counteracts the thinning of the liquid constituent resulting from the increase in temperature. This feature is of considerable value in operations where the product being coated is suspended vertically as is frequently done when webs of such materials as paper or cloth are coated.

The compositions have been successfully employed for putting films on paper for decorative purposes and for protecting surfaces against attack by chemicals. They are also useful where resins are to be employed as an adhesive, as for example in the manufacture of plywood where a number of thin sheets of wood are cemented together to build up a thick sheet. The films dry rapidly to a thick tacky condition without material penetration of the wood and yet are sufficiently penetrative so that they adhere well to the plies. I have also found them to be exceptionally well adapted for other purposes where resins are used as adhesives as in the manufacture of sandpaper and similar products or in building up plies of laminated materials such as sheets of paper or cloth or alternate sheets of cloth and paper or other felted materials.

The specific composition which I have described is satisfactory for the manufacture of films which are .004–.008 inches thick. Where a thicker film is desired, less of the liquid phase is employed and conversely, if a thinner film is desired, the composition can be further thinned with the mixture of liquid resin and water or to some extent with water alone. The coating composition may be applied to materials in any of the conventional ways as by painting, brushing or spraying, or by using transfer rolls such as are commonly employed in coating webs of flexible material with films of liquids. They may be applied at ordinary temperatures or in some instances it is preferred to warm them somewhat as, for instance, up to temperatures as high as 140–150° F. when it is desired that the film shall set rather rapidly.

It is a feature of the invention that the films may be hardened very rapidly to the final insoluble condition because the materials left upon evaporation of the volatile constituents are sufficiently thick so that they do not flow. While the rapid heating tends to thin out the liquid constituent, the solid component is more soluble in the liquid component at higher temperatures and the thinning of the liquid resin normally occurring at higher temperatures is compensated for by the thickening due to the solution of the solid in the liquid component as well as by reaction toward the infusible condition, where heat hardening resins are used. Films of phenol-aldehyde condensation products made in accordance with my invention can be cured to the final infusible, insoluble condition at temperatures of about 350° F. in a few minutes, the actual time depending upon the thickness of the film. For example it is possible to put a completely cured finished film .004 inch thick on a piece of paper in about 30 minutes when employing my coating compositions. By applying the composition at a temperature of about 125–140° F. the coated paper can be passed immediately into a chamber having a temperature of 350° F. or thereabouts and such a film of resin can be applied and completely cured in less than a half hour. It is not possible to use such rapid cures where the conventional coating compositions of the past have been employed because such compositions become very thin if they are normally liquid resins alone and thus soak into the backing, while if they are solutions of normally solid resin in a solvent, the solvent evaporates so fast that the film bloats and becomes porous.

It will be apparent that the invention may be practiced in a number of embodiments additional to those referred to in the specific examples. For instance, while I have referred particularly to the use of a normally liquid phenol-aldehyde condensation product in conjunction with a normally solid phenol-aldehyde condensation product, I have also used the invention successfully with other resinous materials which are compatible with each other and in which the solid material is soluble in the liquid which is left after removal of the volatile constituents of the original liquid phase of the composition. The solid resins may be of the heat hardening type, such as phenolic, urea or alkyds or they may be permanently fusible resins such as certain of the vinyl resins, some forms of alkyds and the natural resins. I may also employ other types of liquid resins than the phenolic condensation products of the examples such as the initial reaction products of urea and an aldehyde or the normally liquid alkyds. By the term "liquid reactive resin," as employed in the claims, I mean the liquid initial reaction products which are capable of being reacted by heating to form solid resinous bodies, such as the liquid initial reaction products of phenol and formaldehyde or urea and formaldehyde.

By the terms "phenol-aldehyde condensation product," "phenolic condensation product" and "phenolic resin," which are used interchangeably in this specification and the accompanying claims, I mean the resinous products obtained by the condensation of a phenol with an aldehyde.

By the term "resin" as employed in this application I mean a complex, amorphous, largely organic material, usually a mixture of substances;

built up by chemical reaction and in the solid state approximating the natural resins in various physical properties, such as luster, fracture, and comparative brittleness at ordinary temperatures. I do not mean to include within this term rubber or synthetic materials of the nature of and ordinarily regarded as being like rubber.

Likewise, while I have described the invention with reference to mixtures of liquid resins with water, I may substitute other materials for water where this appears to be desirable although water is most commonly used because it is cheap, has a satisfactory rate of evaporation at ordinary temperatures, is not explosive, and is generally a desirable material to use. The invention is therefore, not to be limited to the specific embodiments mentioned by way of illustration, but rather is to be considered as being defined within the scope of the appended claims.

I claim:

1. In a method of coating surfaces with a resin film, the steps which comprise mixing water with a liquid heat-hardenable phenolic condensation product miscible therewith to produce a liquid which is a poor solvent for a fusible normally solid phenolic condensation product resin but which leaves a liquid resin which is a good flux for such solid resin when the water is removed from the mixture, suspending a finely-pulverized solid fusible phenolic resin in the mixture, coating a surface with the suspension thus formed, removing the water from the suspending liquid, and heating the resulting product to first cause the liquid resin to flux the solid resin into a homogeneous and poorly penetrative liquid film and then to harden the film, whereby the surface is coated with the resin film without material penetration of the surface by the resin.

2. In a method of coating articles which include a surface which is relatively absorptive to liquid resins, the steps which comprise mixing a finely powdered solid heat-hardenable resin with a homogeneous liquid consisting essentially of water and a normally-liquid heat-hardenable resin which is a solvent for the solid resin, warming the mixture and adding additional water-liquid resin mixture, cooling the mixture whereby to reduce the solubility therein of the solid resin and to obtain a smooth creamy liquid suspension of solid resin in a liquid resin-water mixture, coating the backing with the suspension, allowing the water and volatile constituents of the liquid resin to evaporate from the film provided by the suspension whereby material penetration of the backing by the bond is prevented, and heating the article to cause the liquid resin and the solid resin to flux into a homogeneous film.

3. The method of making a liquid coating composition which comprises mixing water with a liquid heat-hardenable phenolic condensation product to produce a liquid which is a poor solvent for a fusible normally solid phenolic condensation product resin but which leaves a liquid resin which is a good flux for such resin when the water is removed from the liquid, and suspending a finely-pulverized solid fusible phenolic resin in the liquid whereby to produce a composition which is poorly-penetrative and of relatively low viscosity.

4. The method of making a liquid coating composition which comprises mixing a finely powdered solid fusible resin with a homogeneous liquid consisting essentially of a normally-liquid heat-hardenable resin and water, warming the mixture and adding additional water-liquid resin mixture, and cooling the mixture whereby to reduce the solubility therein of the solid resin and to obtain a smooth creamy liquid suspension of solid resin in a liquid resin-water mixture, the said solids being soluble in the said liquid resin.

5. As a liquid coating composition, a smooth creamy liquid suspension of finely divided solid particles of a normally solid fusible resin in a mixture of water and liquid reactive resin miscible therewith, the said mixture being a poor solvent for the said solid resin at ordinary temperatures and the said liquid resin being a relatively good solvent for the said solid resin at said temperatures.

6. The method of making a liquid coating composition which comprises preparing a liquid suspending medium comprising water and a liquid reactive resin miscible therewith, the water and liquid reactive resin being in such proportions that the suspending medium is a poor solvent for solid resins, and suspending in said medium finely-divided solid particles of a normally-solid fusible resin which is compatible with the liquid resin but poorly soluble in the said suspending medium whereby to produce a composition of the nature of a smooth creamy liquid which is poorly-penetrative and of relatively low viscosity.

7. The method of making a liquid coating composition which comprises mixing a relatively thick liquid reactive resin with a thinner liquid reactive resin and with water, heating the mixture thus prepared to advance the reactive constituents to a stage where solids are formed which are precipitated from the liquid mixture when the mixture is cooled, and cooling the mixture whereby there is formed a suspension of finely-divided particles of solid fusible resin in a mixture of water and a liquid reactive resin miscible therewith.

8. A liquid coating composition of the nature of a smooth cream adapted to form a film of resin which is substantially free from porosity without material penetration of absorptive bodies and which comprises a mixture of water with the water-miscible liquid and heat-hardenable initial reaction products of a phenol and an aldehyde, and finely divided solid particles of fusible normally solid phenol aldehyde condensation products mechanically suspended through said mixture.

9. In a method of applying a resinous film to a penetrable backing without material impregnation of the backing by the resin, the steps which comprise preparing a liquid suspension of a finely divided solid fusible resin in a mixture of water and a heat-hardenable liquid resin which is miscible with water and is a solvent for the solid resin, said mixture containing sufficient water to make the mixture a poor solvent for the solid resin, coating the backing with the suspension, removing the water from the mixture and heating the resulting article to flux the solid resin with the liquid resin, whereby to form a homogeneous hardened film attached to the backing but not penetrating the backing to a depth sufficient to embrittle it.

ROBERT L. SMITH.